J. LEDWINKA.
OVERHEAD CROSSING.
APPLICATION FILED SEPT. 27, 1909.

1,102,766.

Patented July 7, 1914.

2 SHEETS—SHEET 2.

Witnesses

Inventor
Joseph Ledwinka
By his Attorneys
Jones, Addington & Ames

UNITED STATES PATENT OFFICE.

JOSEPH LEDWINKA, OF PHILADELPHIA, PENNSYLVANIA, ASSIGNOR TO TRACKLESS TROLLEY COMPANY OF AMERICA, A CORPORATION OF NEW YORK.

OVERHEAD CROSSING.

1,102,766.	Specification of Letters Patent.	Patented July 7, 1914.

Application filed September 27, 1909. Serial No. 519,848.

*To all whom it may concern:*

Be it known that I, JOSEPH LEDWINKA, a subject of the Emperor of Austria-Hungary, residing at Philadelphia, in the county of Philadelphia and State of Pennsylvania, have invented a new and useful Overhead Crossing, of which the following is a specification.

My invention relates to improvements in overhead crossings, adapted for use where two independent trolley lines cross each other.

My invention relates particularly to overhead crossings adapted to be used at the point where street railway and "trackless trolley" lines cross each other. By "trackless trolley" lines, I refer to the electric wires used as conductors for supplying current to electric vehicles not requiring railway tracks upon which to run. Two wires are usually employed, one to supply current, the other being a return wire for the current to the source of supply.

The objects of my invention are, first, to provide an overhead crossing permitting of the free passage of a trackless trolley carrier across the trolley wires of a street railway; second, to provide an overhead crossing that can be easily and quickly installed or removed, and that is safe and fool-proof; third, to provide an overhead crossing in which there can be no leakage between the various trolley wires or short-circuiting; and fourth, so that the passage of the trolley on either line can be made without breaking the current supplied to the motors in the propelled vehicles.

Further objects will more definitely appear from the detailed description to follow. The invention is clearly defined and pointed out in the claims.

A structure embodying the features of my invention is illustrated in the accompanying drawings, forming a part of this application, in which—

Figure 1:
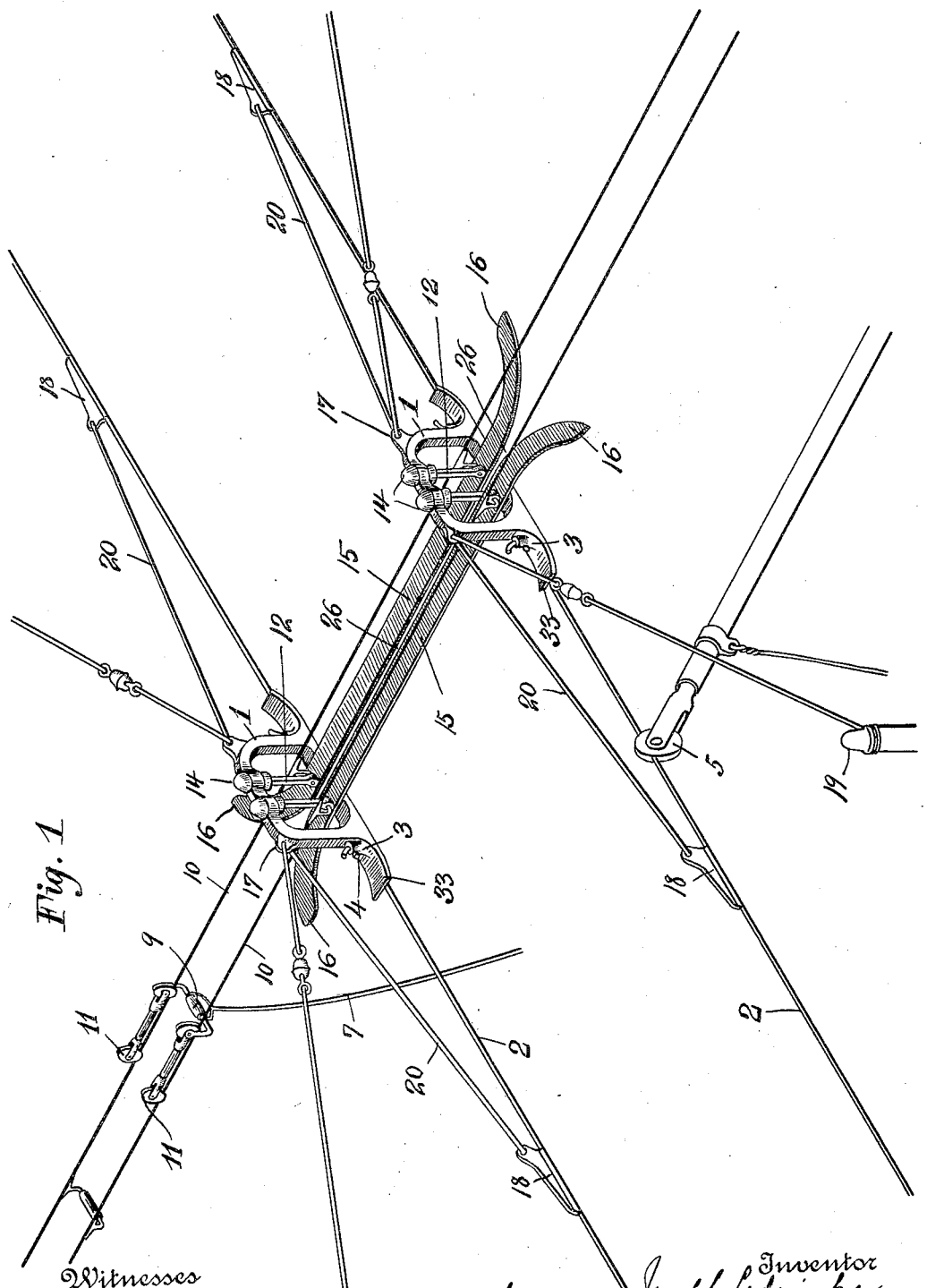
Figure 2:
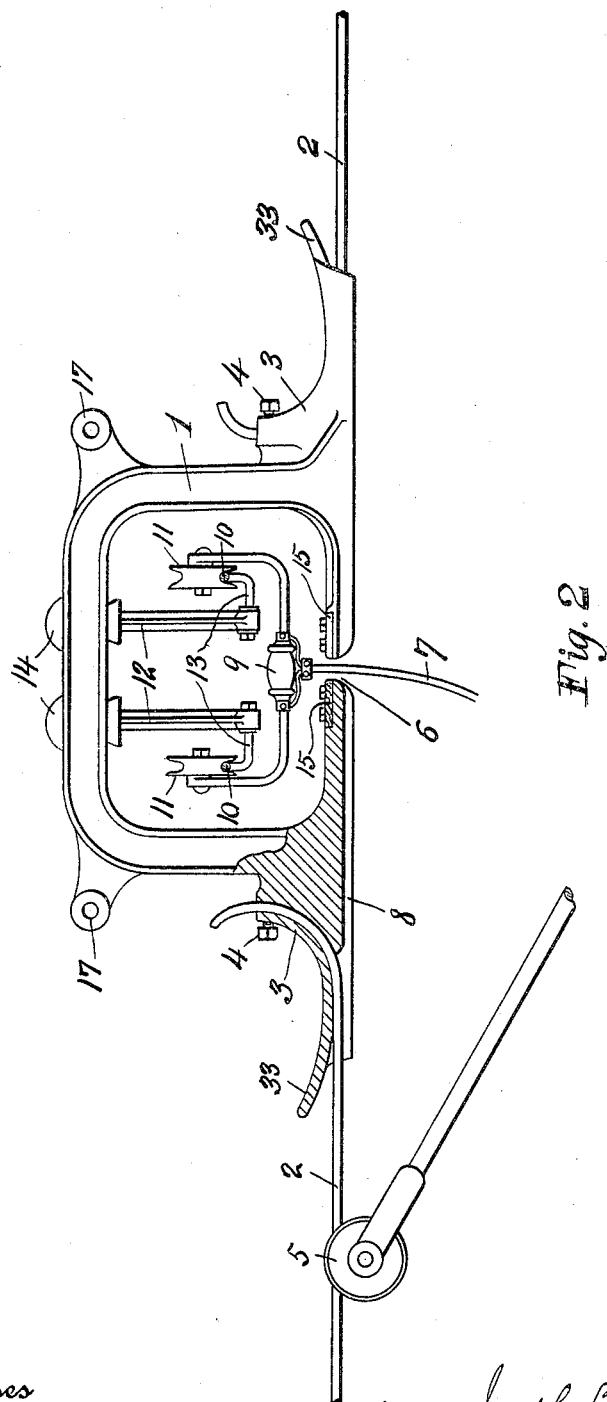

Figure 1 is a view in perspective of my improved overhead crossings, as applied to street railway and trackless trolley lines; Fig. 2 is a side view, partly in section, of one of the overhead crossings shown in Fig. 1.

Similar letters of reference refer to similar parts throughout the several views.

In the preferred form of my invention, I provide a supporting device (yoke or frame) 1 of cast bronze of galvanized malleable iron of sufficient size to withstand the strain of the street railway wires 2, 2, secured thereto and also to act as a conductor of the current carried thereby. The yoke 1 is preferably rectangular in shape to permit of the passage of a trolley carrier 9 therethrough, the lower corners being provided with extensions 3, 3, to which the trolley wires 2, 2, are secured in the standard fashion of breakers used in street railway work. The ends of the wires 2, 2, are detachably secured to the extensions 3, 3, by set-screws 4, 4. The ends 33, 33, of the extensions 3, 3, act as entrance guides for the trolley wheel 5, and each is turned upwardly to ease the approach of the trolley wheel and prevent the blow which would occur at this point if it were not so shaped. The lower side of the yoke 1 is provided with a slot 6 to permit of the passage therethrough of the pole or cable 7 of the trolley carrier 9, the cable 7 being connected to a vehicle to be propelled across the line of the street railway. The slot 6 is much less in width than the diameter of the trolley wheel 5, so that the trolley wheel freely crosses the slot 6 and contact is always made by the trolley wheel with the yoke 1. The under side 8, 8, of the yoke 1 on each side of the slot 6 is concave or hood-shaped to guide the trolley wheel 5 along the under side of the yoke and across the slot.

In the case of trackless trolley lines it is usual to employ two conducting wires (one a supply and the other a return wire for the electric current), and to carry these wires over the wires of a street railway. As shown, the drawings illustrate an overhead crossing for the passage of a trackless trolley carrier 9 on the two wires 10, 10, which cross above the street railway wires 2, 2. The trackless trolley carrier 9 is of the same type shown and described in United States Letters Patent No. 933,084, granted to me on September 7th, 1909. Its two trolley wheels 11, 11, are adapted to run on the wires 10, 10, which pass through the yoke 1. Means are provided for supporting these wires 10, 10, to the yoke 1. In the preferred form of my invention, these means consist of the brackets 12, 12, provided with angle ears 13, 13, bolted thereto, to which are secured the wires 10, 10, the brackets being secured to and insulated from the yoke 1 by standard insulators 14, 14, thereby preventing leakage between the trackless trolley wires and the street railway wires, and also short-circuiting.

Where the trackless trolley line crosses two railway trolley wires (Fig. 1), means are provided for securing two yokes together. To this end, I provide two wooden slides 15, 15, suitably secured to the yokes 1, 1, one on each side of the slot 6, the inner edges of the slides being coincident with the edges of the slot. There is thus formed a slot 26 between the inner edges of the slides 15, 15, for the guidance of the cable 7 therethrough. The ends 16, 16 of the slides 15, 15, are curved outwardly to guide and facilitate the entrance of the cable 7. It will be observed that these slides guard against the cable 7 unseating and pulling the trolley wheels 11, 11 of the trolley carrier 9 from the wires 10, 10. Suitable means are also provided for holding the overhead crossings in place and equalizing the strains placed upon the yokes by the trolley wires. The yokes are provided with ears 17, 17, connected to standard anchor ears 18, 18, carried by the railway trolley wire and to a support 19 by the span wires 20, 20.

It is thus apparent that my invention permits of the free passage of a trackless trolley carrier along the conducting wires of a trackless trolley line, where they cross a street railway line, and through the supporting device or yoke by which the trolley wires are supported.

While I have shown and described a structure embodying my invention in the form preferred by me, yet it is capable of considerable variation without, however, departing from the spirit of my invention.

What I claim as new, and desire to secure by Letters Patent, is:

1. An overhead trolley crossing, comprising a frame, the lower edge of which is transversely slotted and longitudinally grooved, said slot being of less width than the diameter of the trolley wheel, said frame being provided with means for securing it to a support, means for detachably securing the ends of a trolley wire to said frame, insulators mounted in the top of said frame, brackets secured to and depending from said insulators, said brackets being provided with angle ears to support current-conducting wires independent of said trolley wire and passing through said frame, said ears and conducting wires being arranged to permit of the passage of trolley wheels along the upper surface of said conducting wires.

2. In an overhead trolley crossing, the combination with a pair of yokes with their arms extending downward and each yoke being arranged to support an independent trolley wire secured to its lower edge, of a pair of substantially parallel bars connecting said yokes together and maintaining said yokes in a predetermined spaced relation and being arranged to serve as trolley guides.

3. In an overhead crossing, the combination with a plurality of yokes with their arms extending downward and each yoke being arranged to support an independent trolley wire secured to its lower edge and a plurality of current-conducting wires crossing above said trolley wires and through each yoke, of means adapted to guide and maintain a trolley carrier on said conducting wires and to rigidly secure said yokes together.

4. In an overhead trolley crossing, the combination with a plurality of supporting devices, each adapted to allow the free passage of a trackless trolley carrier therethrough and of an independent trolley wheel thereunder, and comprising means for securing independent trolley wires and current-conducting wires crossing above said trolley wires to each device, of means for rigidly securing said devices together, said means being adapted to guide and maintain a trolley carrier in operative relation to said conducting wires.

5. In an overhead crossing, the combination with a pair of frames to support a trolley wire secured to the lower side of each and a plurality of independent trolley wires crossing above said first-mentioned trolley wire at an angle and passing through said frames, of means for rigidly securing said frames parallel to each other, said means acting as a guide to the cable of a trolley carrier passing along said independent trolley wires and preventing the displacement of the trolley carrier between said frames.

In testimony whereof, I sign this specification in the presence of two witnesses.

JOSEPH LEDWINKA.

Witnesses:
CHARLES BERG,
B. DRYFOOS.

Copies of this patent may be obtained for five cents each, by addressing the "Commissioner of Patents, Washington, D. C."